US008693587B2

(12) United States Patent
Giraud et al.

(10) Patent No.: US 8,693,587 B2
(45) Date of Patent: Apr. 8, 2014

(54) METHOD FOR DEMODULATING SIGNALS FROM A MULTI-ACCESS SYSTEM ABLE TO COLLIDE AND EQUIPMENT FOR IMPLEMENTING SAME

(75) Inventors: Jérémie Giraud, Cannes la Bocca Cedex (FR); Thibaud Calmettes, Toulouse (FR)

(73) Assignee: Thales, Neuilly sur Seine (FR)

( * ) Notice: Subject to any disclaimer, the term of this patent is extended or adjusted under 35 U.S.C. 154(b) by 390 days.

(21) Appl. No.: 13/105,410

(22) Filed: May 11, 2011

(65) Prior Publication Data

US 2011/0280347 A1 Nov. 17, 2011

(30) Foreign Application Priority Data

May 12, 2010 (FR) ...................................... 10 02025

(51) Int. Cl.
*H04L 27/06* (2006.01)
(52) U.S. Cl.
USPC ........................................................ 375/341
(58) Field of Classification Search
USPC ......... 375/147, 224, 225, 262, 324, 325, 340, 375/341; 370/335, 337, 342, 344, 347; 714/794, 795
See application file for complete search history.

(56) References Cited

U.S. PATENT DOCUMENTS

| 5,636,123 A * | 6/1997 | Rich et al. ...................... 701/301 |
| 2002/0037737 A1 | 3/2002 | Learned |
| 2008/0304597 A1* | 12/2008 | Peach ............................. 375/324 |
| 2009/0161797 A1* | 6/2009 | Cowles et al. ................. 375/324 |
| 2012/0263163 A1* | 10/2012 | Burzigotti et al. ............. 370/344 |

OTHER PUBLICATIONS

Peter A. Murphy et al., "Co-Channel Demodulation for Continuous-Phase Modulated Signals", pp. 330-334, Published by the IEEE Computer Society, 1058-6393, vol. 96, 1996.
Hendrik Schoeneich et al, "Iterative Semi-Blind Single-Antenna Co-channel Interference Cancellation and Tight Lower Bound for Joint Maximum-Likelihood Sequence Estimation", pp. 1991-2004, Published by Signal Processing 84, 2004.
Yeheskel Bar-Ness et al., "Adaptive Co-Channel Interference Cancelation and Signal Separation Method", pp. 0825-0830, Published by IEEE CH2655-9 vol. 89, 1989.
Joh Hamkins, An Analytic Technique to Separate Co-Channel FM Signals, pp. 543-546, Published by IEEE 0090-6778, 2000.
Kazuhiko Seki et al, "Phase Ambiguiti Resolver for PCM Sound Broadcasting Satellite Service with Low Power Consumption Viterbi Devoder Employing SST Scheme" Published by IEICE Transactions on Communications, Communications Society, Tokyo, JP, vol. E78-B, No. 9, pp. 1269-1277, 1995.
Barthelemy, Pierre, "A Model-Based Receiver for CPM Signals in a Co-Channel Interference Limited Environment", Thesis, May 2002, pp. 1-81.

* cited by examiner

*Primary Examiner* — Young T. Tse
(74) *Attorney, Agent, or Firm* — Baker Hostetler LLP

(57) ABSTRACT

A method for demodulating time-multiplexed signals able to mutually collide, in particular in the case of an AIS (Automatic Identification System), being a communications system between ships allows collisions between these ships to be limited and allows the maritime traffic in view from the coasts to be monitored thanks to coastal stations that listen to the communications. When these colliding signals are sufficiently "distinct" (in frequency, in power or in time), algorithms exist for discriminating between them. The demodulator offers the possibility of demodulating two colliding signals, whose collision parameters (difference in frequency, in power or their non-synchronization) are sufficiently small to make them virtually inaccessible otherwise. The method and equipment allow the satellite AIS system to utilize cases of signal collisions that were hitherto detrimental in order to improve the overall performance.

9 Claims, 4 Drawing Sheets

METHOD FOR DEMODULATING SIGNALS FROM A MULTI-ACCESS SYSTEM ABLE TO COLLIDE AND EQUIPMENT FOR IMPLEMENTING SAME

CROSS-REFERENCE TO RELATED APPLICATIONS

This application claims priority to foreign French patent application No. FR 10 02025, filed on May 12, 2010, the disclosure of which is incorporated by reference in its entirety.

FIELD OF THE INVENTION

The present invention relates to a method for demodulating signals of a multi-access system with transmission according to a multiplexing protocol, in which two signals can mutually collide when they arrive simultaneously at a receiver. The invention is more particularly, but not exclusively, applicable to AIS signals.

BACKGROUND OF THE INVENTION

Amongst the known signals of the time-multiplexed type are those of the AIS system. The AIS (Automatic Identification System) is a public communications system between ships which allows collisions between these ships to be limited and which allows the maritime traffic in view from the coasts to be monitored thanks to coastal stations that listen to the communications. This system advantageously implements satellites for relaying the communications over a wide area. In order to allow the satellite AIS to have an acceptable performance with respect to the performance demands for maritime safety, the highest possible number of tools must be implemented to utilize the colliding signals in order to extract the message from at least one of them.

The circumstances in which signals can collide are manyfold. The colliding signals come from different SO-TDMA (Self Organizing Time Division Multiple Access) cells. The differences in frequency (Doppler), power (distance/free-space loss, antenna gain) and synchronization (distance/propagation time) between these various signals are variable which can allow their discrimination.

Solutions do exist (simple demodulator, SIC or "Sequential Interference Canceller") that provide access to at least one of the colliding signals, in the case where there are a sufficient number of parameters discriminating between them: difference in synchronization, difference in carrier or difference in power.

When the said parameters of two signals are too close, the performance in terms of bit error rate is seriously degraded. In particular, in the worst case of collision between two signals (i.e. signals received at the same power and with identical Doppler frequencies), access to the two signals becomes impossible.

The article "Co-Channel Demodulation for Continuous-Phase Modulated Signals, Peter A. Murphy & Gary E. Ford, IEEE proceedings" discloses a method, the "Joint Maximum Likelihood Sequence Estimation (J-MLSE)", providing possibilities for demodulation of two signals in certain collision circumstances, encountered in cellular communications systems. Thus, this method is applicable in the case of two signals with the same carrier frequency and whose digital contents are synchronized when they are received. This type of method therefore seems to be valid, but in circumstances that are too restrictive, which will not be encountered in other systems, such as in particular the satellite AIS.

SUMMARY OF THE INVENTION

The subject of the present invention is a method for demodulating two signals, of a multi-access system with transmission according to a multiplexing protocol, that can mutually collide, these two signals having digital contents that are synchronized or not when they are received and carrier frequencies, affected by the Doppler, identical or not, this method allowing the detection performance of such signals to be improved, in particular for AIS signals.

The method according to the invention is a method for demodulating two signals able to mutually collide, these signals being those of a multi-access system with transmission according to a multiplexing protocol and with phase modulation of the signals to be transmitted by all the transmitters of the system, a synchronization in time, frequency and phase having been carried out on these signals, and it is characterized in that it consists, on reception, during the demodulation, in measuring the value of the phase of the global signal formed by these two signals and in determining the value of the phase states of each of these two signals and hence their digital contents using the Viterbi method to eliminate ambiguities produced for cases where the phases of the two signals are separated by $k\pi$.

The Viterbi demodulation consists, in the case where the two signals are "confounded", in other words having the same carrier frequency and whose bit transitions coincide, in performing the following iterations: as a first step, measure the phase of the global signal sampled at the bit transition times, which will therefore be common to the two signals; as a second step, estimate, depending on the pair of phase states (one for each signal S1 and S2) coming from the preceding iteration, and for each scenario for a received pair of bits (one for each signal S1 and S2), the expected value of the global phase, this estimated phase being a function of the differences in power of the two signals, in phase states of the two signals, and also in values of phase difference of these two signals due to different path lengths ($\phi_{off1}$ and $\phi_{off2}$); as a third step, calculate the metric associated with each scenario for a received bit pair, this metric being the distance between the measured and estimated global phases; and as a final step, conserve the bit-stream pair (one for each signal S1 and S2) offering the smallest aggregate metric, this aggregate metric being the sum of the aggregate metric calculated in the preceding iteration and of the metric calculated in the third step of the current iteration.

BRIEF DESCRIPTION OF THE DRAWINGS

The present invention will be better understood upon reading the detailed description of one embodiment, taken by way of non-limiting example and illustrated by the appended drawings, in which.

DETAILED DESCRIPTION

Figure 1:
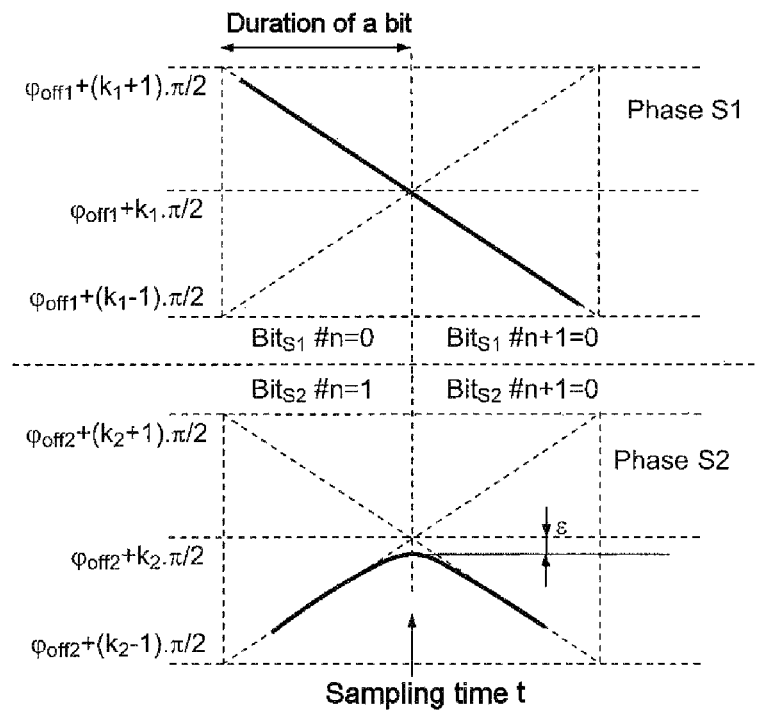
FIGS. 1 to 3 are phase diagrams showing the principle of conventional GMSK modulation construction for the signals transmitted by an AIS system, which signals the invention processes during the demodulation when they are received.

The present invention is described hereinbelow with reference to two signals coming from two different ships and communicating on the same AIS system. It is assumed that these two signals mutually collide when they are received in a processing centre (which may form part of the payload of a satellite for an AIS signal listening system, or else may be a mission or control centre for various other systems), but it will be clearly understood that the invention is not limited to these AIS signals, and that it can be implemented in any communications system multiplexed in the time domain (TDMA), in the frequency domain (FDMA) or by spectral spreading (CDMA) in which several users may wish to simultaneously access the multiplexing system, and for which it is desired to avoid mutual blocking of the requests for access.

It will be noted that, for the collisions of more than two signals, which is statistically sufficiently likely for it to be a consideration, the method of the invention would be difficult to implement directly. This is because:

in the case of two signals, the method of the invention consists, for one phase state of the global signal, in:
  either pointing to a single pair of phase states for the two component signals,
  or pointing to two pairs, and the ambiguity is then lifted by virtue of the Viterbi decoding;
in the case of three signals, the number of combinations is too large: a phase state of the global signal will very probably result in a too large a number of phase state triplets and there will generally be too many ambiguities that will be irresolvable. However, it is possible to wait for a favourable frame (with two colliding signals) in order to resolve this problem as described here.

The present invention starts from the existing principle of coherent demodulation of multi-signal assemblies modulated by phase coding, in this case GMSK (Gaussian Minimum-[phase]-Shift Keying) modulation then extends it to the case where the received signal is a sum (in other words a collision) of two signals with similar characteristics. It will be clearly understood that GMSK modulation is not the only one that can be implemented by the invention, and that other phase modulations may be used, such as MSK (for unsynchronized incident signals).

The method of the invention is implemented after synchronization of the two mutually colliding received signals. This synchronization is applied to the time information (by marking the bit transitions of the signal undergoing synchronization), to the frequency information (by identifying the carrier frequency of the signal undergoing synchronization) and to the phase information (by determining the absolute phase of the signal undergoing synchronization). Such a synchronization is possible for the AIS by performing correlations of the received signal with "training sequences", which are sequences of bits contained in each signal and known to the users of the AIS system. Once the synchronization has been carried out on each signal, the total signal is demodulated (in order to lower it in frequency) using the carrier measured on the strongest signal, and the total signal is sampled at the bit transition times of the strongest signal. By convention, in the following part of the description, the strongest signal is denoted S1 and the weakest signal S2.

The method of the invention essentially consists in determining the value of the phase of the global signal formed from two colliding signals, and in determining the values of the phase states of each of these two signals and hence their digital contents using the Viterbi method to eliminate ambiguities produced for cases where the phases of the two signals are separated by $k\pi$.

It is recalled here that, in the case of the AIS, the GMSK modulation of the signals transmitted by the various ships of the same system is constructed as follows: the phase of the transmitted signal is subjected to a ramp of $\pi/2$ radians (over the duration of a bit) when the transmitted bit value is 1, and $-\pi/2$ radians when the transmitted bit value is 0. In addition, a Gaussian low-pass filter is applied to the transmitted signal, after MSK modulation.

When an AIS signal is received at the control centre, the value of the phase of the signal depends on:
  $\phi_s(n)$: The phase state transmitted by the ship, at the moment of transmission (linked to the bits contained in the message),
  $\phi_{off}$: the phase offset, linked to the distance travelled between the ship and the receiver,
  $\phi_d(n)$: the residual phase drift linked to the frequency synchronization errors.

Hereinbelow, the case of two signals received simultaneously is considered.

In order to describe the solution of the invention, the case is firstly considered where:
  These two signals S1, S2 are "confounded": they have the same carrier frequency and the bit transitions coincide,
  The components $\phi_{off1}$ and $\phi_{off2}$ are random components (linked to the distances travelled by each signal),
  A perfect synchronization in time and in frequency is carried out on the signal S1 (assumed to have the higher power).

The solution of the invention is based on two main mechanisms:
  1. Knowing the value of the phase of the global signal (sum of the two component signals), it is possible to deduce the value of the phase states of each of the two colliding AIS signals. To illustrate this possibility, the following particular case is used.
  Considering the structure of the signal and of its components S1 and S2 in the case where the transmitted bits are respectively:
    signal 1: bit#n=0 and bit#n+1=0, signal 2: bit#n=1 and bit#n+1=0
    signal 1: bit#n=0 and bit#n+1=0, signal 2: bit#n=0 and bit#n+1=1
    signal 1: bit#n=0 and bit#n+1=0, signal 2: bit#n=0 and bit#n+1=0

Figure 2:
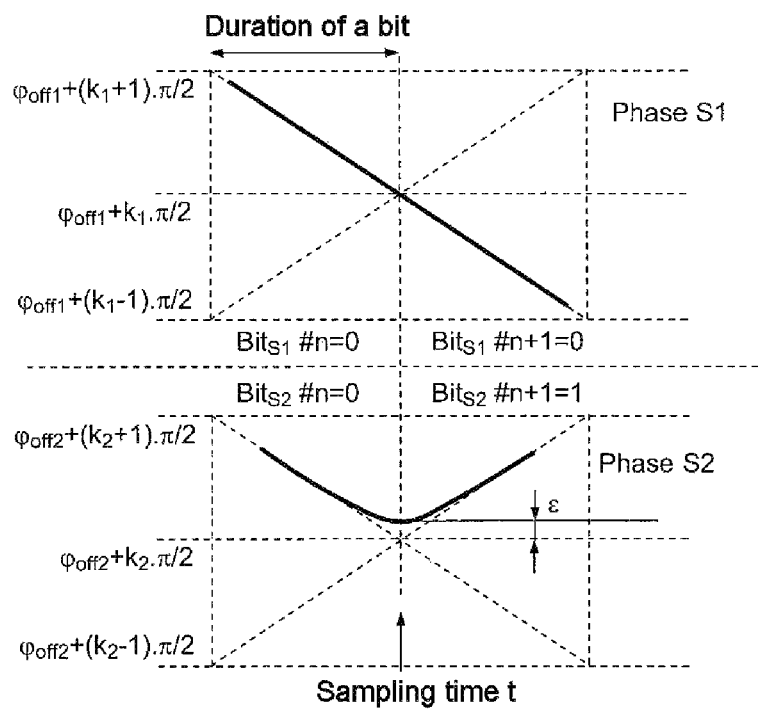
Figure 3:
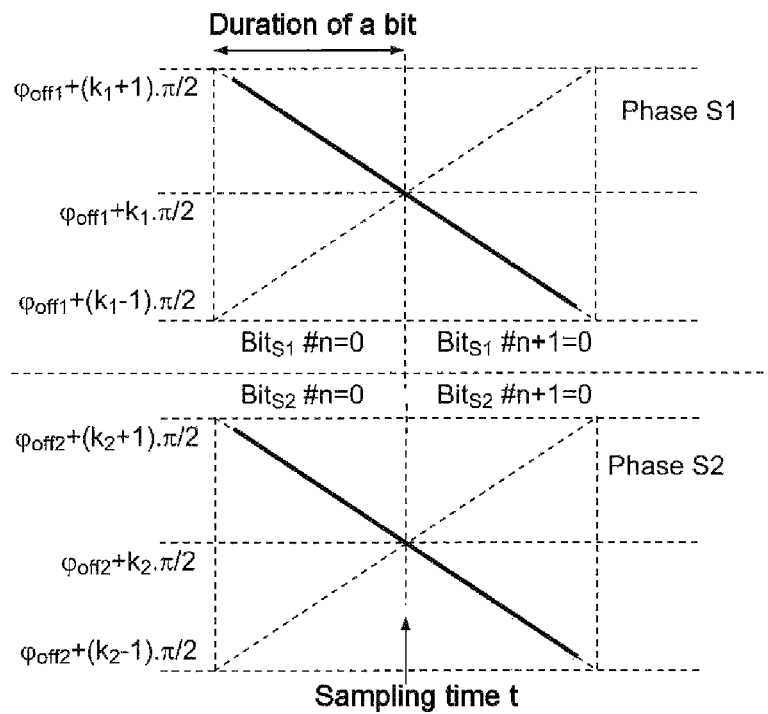

FIGS. 1 to 3 show the conventional phase variation diagrams obtained after GMSK modulation for the aforementioned cases. Each of these diagrams comprises four quadrants (2 upper: signal 1, 2 lower: signal 2) respectively corresponding, from left to right and from top to bottom, to the following cases:
  for FIG. 1: bit (n)=0, bit(n+1)=0, bit (n)=1, bit (n+1)=0,
  for FIG. 2: bit (n)=0, bit(n+1)=0, bit (n)=0, bit (n+1)=1,
  for FIG. 3: bit (n)=0, bit(n+1)=0, bit (n)=0, bit (n+1)=0

On these diagrams, the ramps are traced corresponding, respectively, to $\pi/2$ radians and $-\pi/2$ radians and intersecting at the centre O of the four quadrants. In the case of a bit transition 0-1 or 1-0 (signal 2 in FIGS. 1 and 2), the curves representing the variation of the phase do not pass through O but curve inwards close to this centre O, at a distance $\epsilon$ from the latter owing to the Gaussian filtering, whereas in the case of transitions 1-1 and 0-0 (FIG. 3), these phase curves pass through O. The narrower the band of the Gaussian filter, the greater the distance $\epsilon$. In contrast, for a wide band, epsilon is reduced eventually to zero (infinite band, in other words there is no filtering). That is the case for MSK, and the phases pass through O whichever bit transitions are considered.

Figure 4:
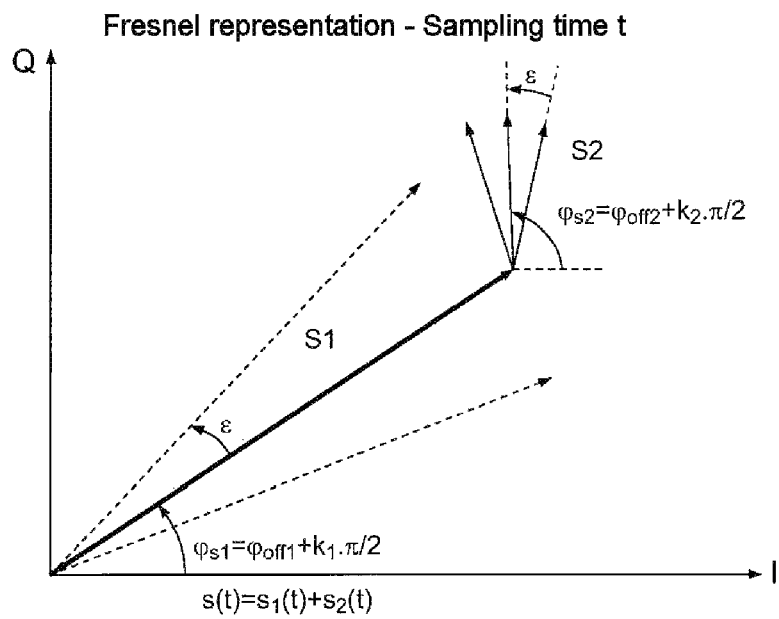
FIGS. 4 to 8 are diagrams of an example of determination of the value of the phase and Fresnel states for each of two mutually colliding AIS signals, according to the present invention.

In those cases, the various Fresnel representations of the global signal at the indicated moment of sampling (bit transition) are given on the graph in FIG. 4 (this shows the three previous cases)

Figure 5:
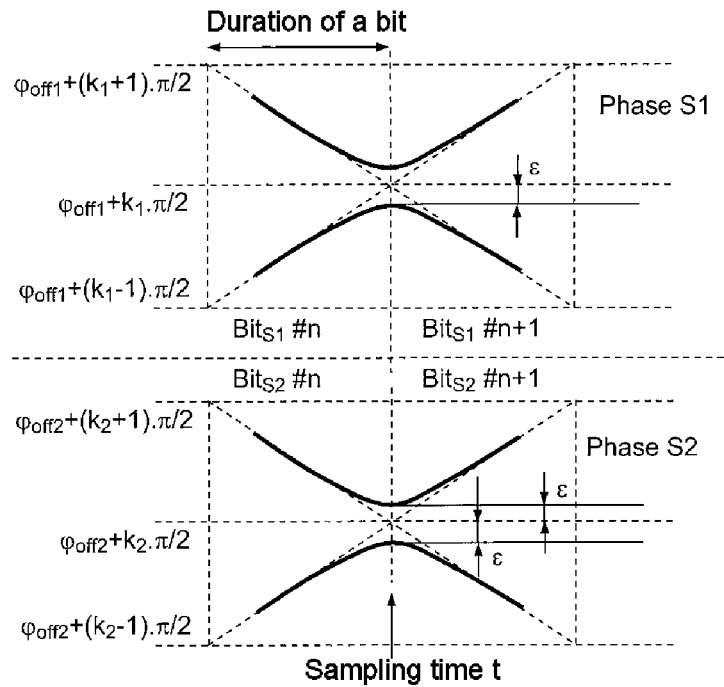
Figure 6:
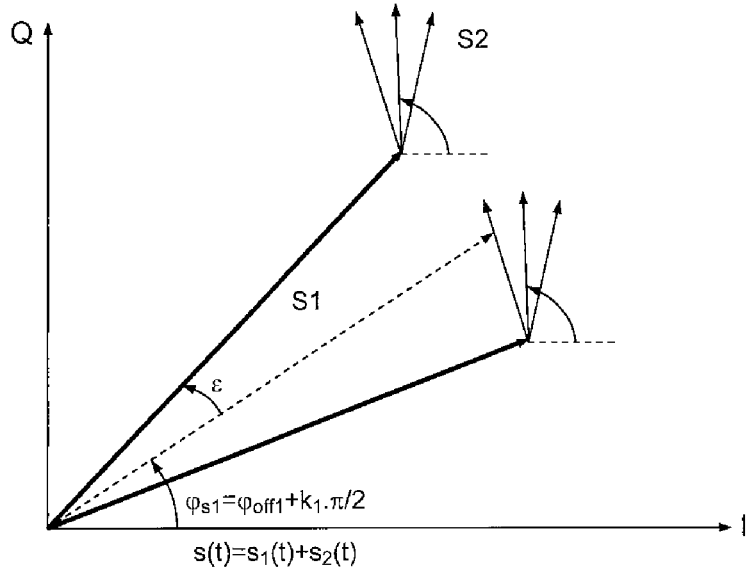

In the same way, by envisaging the same bit transitions on the signal 2, but the transitions [bit#n=0/bit#n+1=1] and [bit#n=1/bit#n+1=0] on the signal 1, the corresponding phase and Fresnel diagrams are obtained, as shown in FIGS. 5 and 6.

Thus, for the full set of bit transitions envisaged on the two signals S1 and S2 composing the signal to be demodulated, it is possible to establish a virtually one-to-one correspondence between:

on the one hand, the phase of the global signal at the moment of sampling, and, on the other hand, the pair of phase states for each of the signals at the same moment of sampling.

Figure 7:
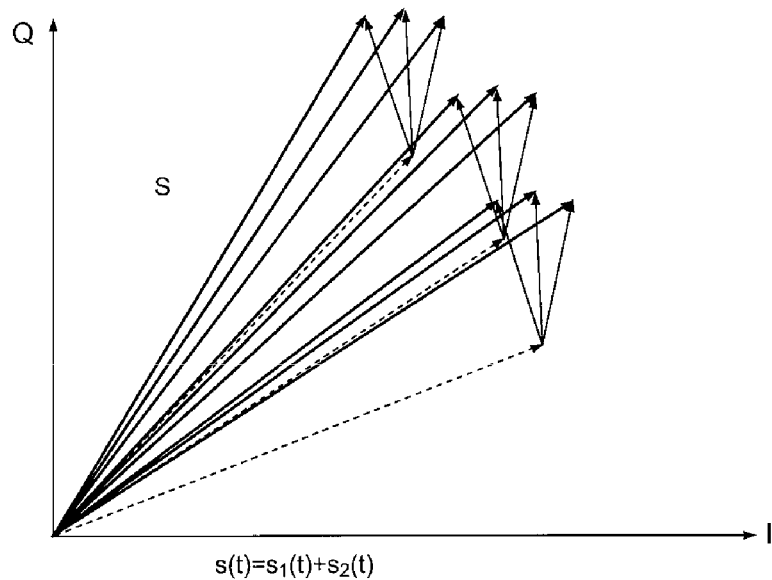

This is illustrated by the graph in FIG. 7.

Figure 8:
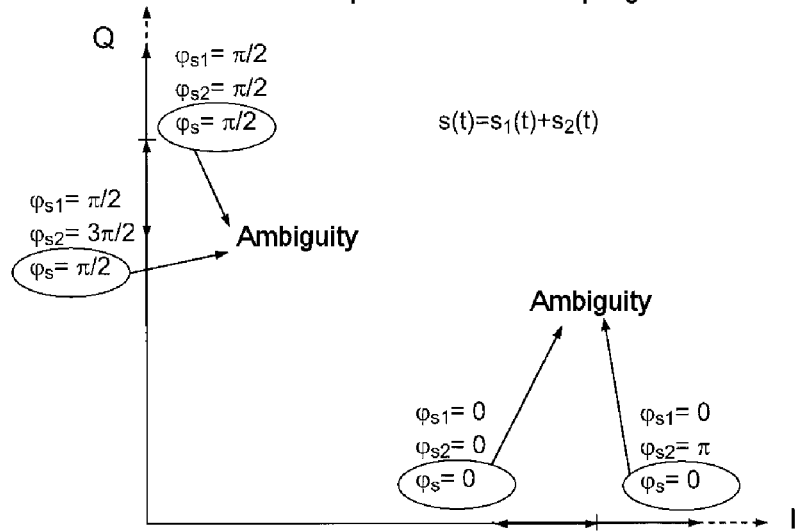

2. The term "virtually one-to-one" is due to the presence of ambiguities in the demodulation process. In the particular case illustrated in FIG. 8, the same value for the phase of the global signal can be associated with two distinct pairs of phase states for each signal component. Such ambiguities occur in the case where the phases of the two component signals are separated by (k.π).

By demodulating according to the Viterbi method, the majority of these ambiguities can be eliminated.

The chosen states of the lattice are then phase state pairs (signals S1 and S2). The successive iterations are then performed as follows:

at each bit transition, the value of the global phase is sampled depending on the pairs of preceding phase states (previous level of the Viterbi lattice), and for each scenario for a received pair of bits, the expected value of the global phase is estimated. This estimated phase is a function of the power difference of the two signals, of the phase states of the signals S1, S2, and also of the values of $\phi_{off1}$ and $\phi_{off2}$.

a metric is then associated with each scenario for a received pair of bits. This metric, which will be used in the execution of the Viterbi algorithm, will have to take account of the difference between the tested scenario and the measured reality. This metric may be defined as the difference between the measured and estimated global phases.

the bit-stream pair (one for each signal S1 and S2) offering the smallest aggregate metric is then conserved, this aggregate metric being the sum of the aggregate metric calculated in the preceding iteration and the metric calculated in the third step of the current iteration (preceding point).

The method of the invention may also be extended to the cases where the signals are unsynchronized (non-coincident bit transitions), or of different carrier frequencies: the calculation of the global estimated phase then not only takes into account the phase states of the signals S1, S2 and the values of $\phi_{off1}$ and $\phi_{off2}$, but also the phase difference and drift of the signal S2 with respect to S1 (it will be noted that since the synchronization in time and in frequency is carried out on the signal S1, no phase shift nor drift occurs on this signal).

The solution according to the invention has the following advantages. In the case of collisions with two signals, this solution enables a much more effective demodulation of the main signal (the strongest), together with a non-negligible demodulation performance on the "interfering" signal (the weakest). By way of example, in a collision scenario where two signals are simultaneously received, with the same frequency, synchronized (in other words, when received the bit transitions are simultaneous), for a signal S2 which is 5 dB weaker than the signal S1, and beyond 60 dB.Hz signal-to-noise ratio on the signal S1, the likelihood of detection by a simple single-signal demodulator, applied to the two signals S1 and S2 separately, is negligible, whereas the multi-signal demodulation carried out according to the invention allows the demodulation of at least one of the two signals.

The invention claimed is:

1. A method for demodulating a modulation of two simultaneously received signals (S1, S2) transmitted from different locations of a multi-access system, wherein the two simultaneously received signals have been synchronized in time, frequency and phase, the method comprising:

determining a value of the phase of a global signal formed from the modulation of the two signals; and determining values of phase states of each of the two signals and digital contents of each of the two signals using a Viterbi demodulation to eliminate ambiguities when phases of the two signals are separated by kπ, wherein the Viterbi demodulation, when the two signals include a same carrier frequency and coinciding bit transitions, comprises the following iterations:

measuring the phase of the global signal sampled at bit transition times that are common to the two signals;

estimating, based on the phase states of the two signals and a received pair of bits of the two signals, an expected value of the phase of the global signal, the estimated expected value of the phase of the global signal being a function of differences in power of the two signals, in the phase states of the two signals, and in values of phase differences of the two signals due to different path lengths ($\phi_{off1}$ and $\phi_{off2}$);

calculating a metric associated with each received pair of bits of the two signals, the metric being a distance between the measured phase of the global signal and the estimated expected value of the phase of the global signal; and conserving a bit-stream pair of the two signals associated with a smallest aggregate metric, the aggregate metric being calculated according to the sum of the calculated metric in a preceding iteration and of the calculated metric in the current iteration.

2. The method according to claim 1, further comprising, when the bit transitions of the two signals are not coincident, measuring the phase of the global signal sampled at the bit transition times of a strongest of the two signals, and estimating the expected value of the phase of the global signal as a function of a difference in phase of the second signal (S2) with respect to the first signal (S1).

3. The method according to claim 1, further comprising, when the two signals have different carrier frequencies, estimating the expected value of the phase of the global signal as a function of a drift in phase of the second signal (S2) with respect to the first signal (S1).

4. The method according to claim 1, wherein the two signals are associated with time division multiple access, frequency division multiple access, or code division multiple access systems.

5. The method according to claim 1, wherein the two signals are associated with Doppler or propagation time reception conditions.

6. The method according to claim 1, wherein the method is implemented by a satellite communications system.

7. The method according to claim 1, wherein the method is implemented by an equipment.

8. The method according to claim 1, wherein the method is implemented by an equipment located onboard a satellite.

9. The method according to claim 1, wherein the method is implemented by an equipment integrated into a ground-based mission center.

* * * * *